(12) United States Patent
Regnier

(10) Patent No.: US 6,451,446 B1
(45) Date of Patent: Sep. 17, 2002

(54) POLYPROPYLENE/POLYSTYRENE MULTILAYER FILM STRUCTURES

(75) Inventor: Francois J. F. Regnier, Weyersheim (FR)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/424,097

(22) PCT Filed: May 21, 1998

(86) PCT No.: PCT/US98/10432

§ 371 (c)(1),
(2), (4) Date: Mar. 21, 2000

(87) PCT Pub. No.: WO98/52749

PCT Pub. Date: Nov. 26, 1998

(51) Int. Cl.[7] .......................... B32B 27/08; B32B 27/32; B29C 55/12

(52) U.S. Cl. ....................... 428/515; 428/500; 428/516; 428/910

(58) Field of Search ................................. 428/515, 516, 428/910, 500

(56) References Cited

U.S. PATENT DOCUMENTS

| | | | | |
|---|---|---|---|---|
| 4,101,047 A | * | 7/1978 | Geppert et al. | 220/258 |
| 4,234,663 A | * | 11/1980 | Catte et al. | 428/517 |
| 4,292,355 A | * | 9/1981 | Bonis | 428/35 |
| 4,464,439 A | | 8/1984 | Castelein | 428/517 |
| 4,608,284 A | | 8/1986 | Roales | 428/35 |
| 5,468,563 A | * | 11/1995 | Reiners et al. | 428/515 |

FOREIGN PATENT DOCUMENTS

| | | | |
|---|---|---|---|
| DE | A-4312388.0 | | 10/1994 |
| FR | 1404044 A | * | 5/1965 |
| GB | 1357950 | | 6/1974 |
| GB | A-2111908 | | 7/1983 |
| GB | A-2281282 | | 3/1995 |
| JP | A-51-19079 | | 2/1976 |
| JP | A-51-28879 | | 3/1976 |
| JP | A-55-57428 | | 4/1980 |
| JP | 55057428 | * | 4/1980 |
| JP | 550557428 A | * | 4/1980 |
| JP | A-80-23746 | | 6/1980 |
| JP | A-55-148155 | | 11/1980 |
| JP | A-55-163164 | | 12/1980 |
| JP | A-56-27326 | | 3/1981 |
| JP | A-59-174324 | | 10/1984 |
| JP | A-63-110150 | | 5/1988 |
| JP | 07292171 | * | 11/1995 |
| NL | A-69-13608 | | 3/1970 |
| WO | A-0122495 | | 11/1989 |

* cited by examiner

Primary Examiner—Michael Barr
Assistant Examiner—Elena Tsoy

(57) ABSTRACT

An oriented co-extruded film suitable for use as a window film for mailing envelopes, having a polyolefin layer and a non-glossy surface layer of polystyrene.

12 Claims, No Drawings

POLYPROPYLENE/POLYSTYRENE MULTILAYER FILM STRUCTURES

This invention relates to a transparent or translucent multilayer film having at least one low gloss layer which may be readily bonded to paper. The film has particular utility for windows in envelopes.

It is known to use polymeric films for windows in paper envelopes. Such window envelopes save the resources necessary to separately address an envelope on its surface, or to apply an address label to the envelope. A letter, invoice, or other contents may be shaped to size, as by folding, as necessary, to place the address of the intended recipient appearing on the contents in a position to be visible through the window comprising the polymeric film.

Films having applicability as envelope windows are known. DE-A- 4312388.0 discloses a transparent stretched polypropylene film having a reflection-reduced surface, which is bondable. The film comprises polypropylene of at least two layers. Reduced reflection is obtained by incorporation of a substantially propylene/ethylene copolymer incorporating linear low density polyethylene and maleic anhydride. The disclosed films are stretched on two axes.

DE-A-4312388.0 reports that polystyrene film and PVC film have been used as window envelopes. Biaxially oriented polypropylene films have been used, but such films are there reported to be not readily bondable to paper by fast running envelope manufacturing equipment.

Polystyrene surfaces however are known to the manufacturers of envelopes. Adhesion products for bonding the window film to envelopes are known, and effective. Polypropylene however offers a cost advantage over polystyrene.

It is known to prepare films having layers of polypropylene and polyethylene from GB-A- 2281282, and GB-A-2111908.

JP-A-51-28879 promotes a biaxially stretched film of propylene and laminate of styrene butadiene thermoplastic elastomer. This film is claimed to exhibit good heat-sealing characteristics.

JP-A-55-57428 discloses a film of polystyrene laminated on polypropylene which is subsequently biaxially oriented (stretched). Its use as tape suitable for wrapping of heavy objects is proposed.

JP-A-55-148155 discloses three-layer films comprising:
1) a layer of styrene and block polystyrene-butadiene in combination with a solvent for the styrene-butadiene block copolymer,
2) a flexible layer which may be polypropylene and ethylene-vinyl acetate co-polymer, and
3) a drawn layer which may be polypropylene.

The film is proposed as easy-open storage bags for food, which remains pliable at freezing temperatures, yet may withstand boiling water.

JP-A-55-163164 also discloses a food container formed from a film of biaxially stretched polystyrene onto which a polypropylene layer is cast or laminated.

JP-A-80-23746 discloses a food packaging film of polystyrene, having a polypropylene layer of 1/10 to 1/100 the thickness of the polystyrene layer. The layer film is stretched.

JP-A-56-27326 discloses a laminated sheet of polystyrene/butadiene/styrene and polypropylene which is biaxially stretched. The film is proposed for adhesives tapes.

JP-A-89-174324 discloses a biaxially stretched polypropylene film having reduced gloss and luster, as a wrapping material. The polypropylene is coated with an emulsion containing styrene, after corona discharge treatment.

JP-A-63-110150 teaches lamination of polystyrene film and a polyolefin film for use as bags.

NL-A-69-13608 discloses stencil film of oriented polypropylene film optionally laminated with polystyrene.

U.S. Pat. No. 4,608,284 teaches a laminate of an oriented polystyrene film, which may have been printed on the laminated surface, and a polypropylene film which has not been oriented. An adhesive joins the films at their interface surfaces. The films find use as heat-shrinkable printed labels.

U.S. Pat. No. 5,468,563 discloses films asserted to have utility as window film prepared from polypropylene. A reflection reduced layer is suggested of rubber modified ethylene and maleic anhydride, co- and terpolymer of propylene/ethylene/butylene having propylene as the principal component, or copolymers of propylene/polyethylene block copolymers. The core layer is comprised of isotactic polypropylene, a random propylene co-polymer. A second outer layer is constituted from the materials of the core layer having anti-block agents added. The layers may be co-extruded, then stretched EP-A-01 22495 discloses films of biaxially oriented polypropylene, laminated to an olefin polymeric film having at least three peaks between 120° C. and 65° C. when analyzed by DSC (differential scanning calorimetry). The multiple peaks are said to produce low gloss and a high haze. End use as a decorative wrapping paper having a metallized surface thereon for example by lamination is suggested.

JP-A-51-19079 discloses a multi-layer composite film in which one layer is formed from a polyolefin (such as polypropylene) and one layer is a thermoplastic layer obtained by adding 5–30 parts by weight of a styrene-butadiene copolymer to a polystyrene resin. The multi-layer film is manufactured by co-extrusion and thermal fusion of the layers. No orientation of the films is carried out.

U.S. Pat. No. 4,464,439 discloses a co-extruded laminate formed from at least one sheet of crystalline polypropylene and at least one sheet of polymeric material consisting of a mixture of high-impact polystyrene, crystalline polypropylene and styrene/dienic monomer block copolymer. No orientation of the films is carried out.

GB-A-1 357950 discloses a thermoplastic laminate having at least two layers, one of which is a ternary blend of a homopolymer or copolymer of a vinyl aromatic monomer; a homopolymer or copolymer of an olefin monomer; and a block copolymer having a polyvinyl/aromatic block and a polyolefin block. No orientation of the films is carried out.

Films for envelope windows require several properties. As noted in U.S. Pat. No. 5,468,563, several important properties include: bondability of the window film to the paper of the envelope using bonding agents conventional in the industry and transparency in order that the address is readable through the envelope by postal sorting machines. While transparency is important a window that is transparent and also glossy reflects light. The reflected light may impair the efficiency of the postal sorting machines and indirectly the arrival date of the envelope and contents to the addressee.

According to the invention there is provided an oriented polymeric film comprising a co-extrudate of a first layer having at least 96 weight percent of a polypropylene and of an external layer having (by weight)
 a) from 70 to 97% of polystyrene, rubber modified polystyrene or a blend thereof, and
 b) from 3 to 30% of a polypropylene/polystyrene compatibilizer selected from the group of ethylene vinyl acetate copolymer and block or random copolymers of a vinyl aromatic compound and an olefin, wherein the film has a minimum stretch ratio of 3 in the machine direction, and 4 in the transverse direction.

Multi-layered polymeric films may be formed by co-extruding the film layers. However, when a film is formed from a co-extrudate of two layers in accordance with the invention, it is found that the co-extrudate layers are separable simply by pulling them apart by hand, for example by using office adhesive tape adhered to each side of the film.

It has now been discovered that, if the co-extiudate layers are oriented in both the machine direction and the transverse direction after the film has been co-extruded, then this results in a film in which the co-extrudate layers are extremely difficult to separate.

Another advantage of the oriented films is that they have a higher modulus (higher rigidity) than non oriented films. Rigidity (high modulus) is a property required for window envelope film for two reasons: for the envelope converter to allow an optimum window patch unit feeding on the envelope machine, and for the final envelope to minimize wrinkling/buckling of the window panel.

The "first layer" comprising polypropylene is from time to time referred to herein as a "core layer", since for reasons of economy, it will usually be the predominant layer, and because frequently outer layers are provided on both sides of the polypropylene layer. However, the description "core layer" should not be taken to imply that external layers are necessarily provided on both sides of the core layer.

The applicants have observed that polystyrene meets many of the limitations required by envelope window film. Polyolefins however provide cost advantage.

The films according to the invention are advantageously co-extruded of a comparatively less expensive core layer of polypropylene. A (usually thinner) layer comprising substantially polystyrene provides the required gloss and bondability to paper when used with conventional glue for window film applications.

The polypropylene employed in the core layer may be a homopolymer or copolymer and may preferably be predominantly isotactic polypropylene having a density of from 0.895 to 0.910, and a melt index of from 0.5 to 10 g/10 min (230° C./2.16 kg.). Optionally, additional components conventional to the film industry may be added to the polypropylene core layer for example, additives for control of slip, such as erucamide, stearamide, or oleamide; additives for control of block such as silica, or calcium carbonate; additives for control of static such as ethoxylated fatty acid amides, alkyl benzene sulfonates, or polyethylene glycol esters; additives to aid clarity of the film such as dibenzylidene sorbitol; and additives to aid processing such as a fluoroelastomer, or a polyamide. The amounts for each optional component may range from zero to one percent by weight. In the aggregate all optional components generally do not exceed four, preferably not more than three per cent by weight of the polypropylene layer.

In one embodiment, the amount of polystyrene is from 50% to 95% by weight and the amount of rubber modified polystyrene is from 0 to 50% by weight based on the total weight of the external layer.

The polystyrene employed in the external or low-gloss/bonding layer is preferably general purpose polystyrene (GPPS), preferably GPPS having a melt index of from 0.5 to 15 g/10 min (200° C. 5 kg weight).

Optionally present in the external or low-gloss/bondable layer is high impact polystyrene (HIPS). The HIPS may be present in an amount of from zero to fifty per cent by weight of the low-gloss layer. The HIPS preferably has a melt index of from 0.5 to 15 g/10 min (200° C. 5 kg weight) and a rubber content of from 4 to 15 weight percent.

The external or low-gloss/bondable layer also includes from three to thirty percent, arid preferably 15%, of a compatibilizing compound useful to compatibilize polypropylene and polystyrene. A preferred compatibilizing component is an ethylene vinyl acetate copolymer having a vinyl acetate content of from fifteen to thirty weight percent and a melt index of from 0.5 to 25 g/10 min (190° C. 2.16 kg weight). A further preferred compatibilizer is a block or random copolymer of a vinyl aromatic compound and an olefin. Suitable compatiblizing components which are styrenic copolymers include: styrene-butadiene-styrene (SBS); styrene-isoprene-styrene (SIS); styrene-isoprene (SI); styrene-butadiene (SB); styrene-ethylene-butylene-styrene (SEBS) having a melt index of from 0.5 to 35 g/10 min (200° C. ,5 kg weight) and a styrene content of from 10 to 50 weight percent; and ethylene-styrene interpolymers having a melt index of from 0.5 to 40 g/10 min (190° C. 2.16 kg weight) and a styrene content of from 5 to 80 weight percent.

The presence of the compatibilizing component in the external layer is also an advantage for the disposal of film which is not of a grade suitable for sale. Small amounts of the co-extruded film including the low-gloss bonding layer which comprises polystyrene film may be included with polypropylene core layer as a "re-grind". In this manner waste generated in manufacture may converted to useful products. Incorporation of re-grind film is advantageously at a minimum, but up to 25 per cent by weight of re-grind may be incorporated in the propylene core layer when compatibilizers within the ranges described are included in the external layer.

Excess gloss results in light reflection from the film surface. Reduction of gloss generally also leads to opacity of the film, thus making the address difficult to read through the film. The gloss level of the film is preferably below 105%, more preferably below 100%.

The film is preferably extruded from a slot or a circular die.

The orienting of the film occurs after the film is co-extruded. The film may be re-heated to from 120° C. to 170° C., and oriented in the Machine Direction (MD) to form a film from 3 to 7, preferably from 4 to 6, times the original length and in the transverse direction of from 4 to 12, preferably from 5 to 9, alternatively from 6 to 10 times the original width. The orientation of the film may occur simultaneously or sequentially. Different re-heating temperatures may be used for the MD and TD orientations. The oriented film may optionally then be annealed for example at a temperature of from 5 to 15° C. above the orientation temperature. Each step in the process of orienting the film is generally completed in a few seconds, for example less than three seconds, after the film reaches the chosen temperature.

The co-extrudate consists of 2 or more layers. Additional low-gloss/bonding layers can improve the low gloss properties even though the additional low gloss layer may be on the opposite side of the film from the measured surface.

It is important for window film that the film is able to form a strong bond to paper. The bond strength is preferably at least 3 N/2.5 cm, preferably at least 4 N/2.5 cm.

In a second aspect of the invention, there is provided a polymeric film comprising a co-extrudate of a first layer having at least 96 weight percent of a polypropylene and of an external layer having (by weight)

a) from 50% to 95% polystyrene b) from 0 to 50% rubber modified polystyrene c) from 0 to 30% of a polypropylene/polystyrene compatibilizer, selected from the group of ethylene vinyl acetate copolymer and block or random copolymers of a vinyl aromatic compound and an olefin, wherein the sum of components b and c is from 5% to 50% of the external layer. In an alternative embodiment, said film is orientated as described above, and in the preferred ratios described above.

In a third aspect of the invention, there is provided a window envelope having a transparent panel, which panel is formed from a polymeric film as described hereinbefore.

In a fourth aspect of the invention, there is provided the use of a polymeric film as described hereinbefore as a transparent panel in a window envelope.

The following examples illustrate the invention, but are not intended to limit the scope of the invention.

EXAMPLE 1

A symmetrical three-layer film structure of "A-B-A" is produced with a polypropylene core and low gloss external layers using a cast coextrusion process. The polymer of the core layer and the polymer of the low-gloss layer areextruded from separate extruders at a temperature of from 225 to 230° C. The polymers are combined in a feedblock and then flow in a coat hanger type slot die having an opening of 635 μm. The polymer emerging from the die is then cast on a chill roll at 24° C. The thickness of the three layer films on the chill roll is 345 μm. After the extrusion, the film is re-heated to 150° C. and stretched at a 3 to 1 ratio in the machine direction and a 5 to 1 ratio in the transverse direction. The film composition and the thickness of each layer is listed in Table 1.

COMPARATIVE EXAMPLE 2

Comparative Example 2 was a cast biaxially oriented propylene film with a thickness of 36 μm (available from UCB Avenue Louise 326, B-1 050, Brussels, BELGIUM under the trade name RAYOPP™ 439). This film is a biaxially oriented polypropylene film having a polymeric acrylic coating on both sides.

COMPARATIVE EXAMPLE 3

Comparative Example 3 was a commercially available biaxially oriented polystyrene film of thickness 32 μm commercially available under the trade designation DOW Window Film™ 6003E, available from Dow Deutschland Inc., and sold for use in envelope windows.

TABLE 1

| | | | | Film Structure | | | | |
|---|---|---|---|---|---|---|---|---|
| | | Ex. 1 | Ex. 2 | Ex. 3 | Ex. 4 | Comp. 1 | Comp. 2 | Comp. 3 |
| | | | | Ratio of layers | | | | |
| | | A/B/A | A/B/A | A/B/A | A/B | 1 | A/B/A | |
| | | 31/38/31 | 15/70/15 | 15/70/15 | 17.5/82.5 | B | B > 95% | B |
| LAYER "A" | GPPS M.I. = 8.5 g/10 min (200° C./5 kg) | 70% | 70% | 70% | 70% | 0 | | |
| | HIPS M.I. = 2.3 g/10 min (200° C./5 kg) 7.2% polybutadiene | 15% | 15% | 15% | 15% | 0 | | |
| | Styrene-butadiene-styrene-copolymer M.I. = 11.5 g/10 min (200° C./5 kg) 44.5% Styrene Oriented/stretching at 150° C. | 15% | 15% | 15% | 15% | 0 | | |
| | machine direction (MD) | 3 X | 5 X | 4 X | 5 X | 5 X | An acrylic | |
| | transverse direction (TD) | 5 X | 5 X | 6 X | 5 X | 5 X | coating | |
| LAYER "B" | Polypropylene homopolymer M.I. = 3.0 g/10 min. 230° C./2.16 Kg | 100% | 100% | 100% | 100% | 100% | | |
| | Polypropylene | | | | | | bi-axially orienied | |
| | Polystyrene | | | | | | | bi-axially oriented |
| | Thickness μm | 22 | 23 | 25 | 20 | 15 | 36 | 32 |
| | Gloss % 60° C. MD | 16 | 11 | 9 | 19(*) | 15 | 30 | 95 |
| | 1% modulus MD MPa. | 970 | 465 | 760 | 115 | 040 | 465 | 100 |
| | 1% modulus TD MPa. | 275 | 795 | 930 | 265 | 800 | 100 | 900 |
| | Ultimate elongation MD % | 175 | 120 | 125 | 40 | 40 | 100 | 25 |
| | Ultimate elongation TD % | 65 | 40 | 45 | 35 | 45 | 115 | 5 |
| | Bond strength on paper N./2.5 cm. | 4.5 | 7.5 | not measured | 6.0(*) 1.0(#) | 1.2 | 8.8 | 4.6 |

(*)property measured on thc low gloss layer of this film
(#)property measured on the high gloss layer of this film

EXAMPLES 2–4

Examples 2–4 were prepared in the same manner as in Example 1 but substituting the composition, ratios, and post treatment stated in Table 1.

COMPARATIVE EXAMPLE 1

A Polymer film is extruded from a die having a opening of 635 μm on to a chill roll having a temperature of 24° C. The thickness of the extrudate is 500 μm. The film is comprised of 100% polypropylene homopolymer with a melt index of 3.0 g/l 0 min (240° C./2.16 kg) after extrusion the film was stretched at a 5 to 1 ratio in the machine direction and at a 5 to 1 ration in the transverse direction at 150° C. to a final thickness of 20 μm.

Table 2 shows that comparative example 4 has a very high percentage of holes, incompatible with an economical commercial film production. Comparative Example 5 has a high gloss (above 100%) and a high % of holes area.

TABLE 2 shows that the Examples 5 to 9 combine a low gloss, good adhesion on to paper and a very low percentage of holes area (the holes of these examples were located only near the edges of the film, in the vicinity of the orientation clamps). This low level of holes is attrbuted to the presence of the PP/PS compatibilizer in the A layer formulation of these films which increases the interfacial adhesion between the A and B layers.

TABLE 2

| | | Film Structure | | | | | | |
|---|---|---|---|---|---|---|---|---|
| | | Ex. 5 | Ex. 6 | Ex. 7 | Ex. 8 | Ex. 9 | Comp. 4 | Comp. 5 |
| | | Ratio of Layers (vol. %) | | | | | | |
| | | A/B | A/B | A/B/A | A/B/A | A/B/A | A/B | A/B |
| | | 30/70 | 13/87 | 18/64/18 | 15/70/15 | 10/80/10 | 17/83 | 15/85 |
| LAYER(s) A | GPPS M.I. = 8.5 g/10 min (200° C./5 kg.) | 90% | 80% | 80% | 70% | 90% | 90% | 100% |
| | HIPS M.I. = 8.5 g/10 min (200° C./5 kg.) 7.2% polybutadiene | | 10% | 10% | 15% | | 10% | |
| | HIPS M.I. = 2.8 g./10 min (200° C./5 kg.) 7.0% polybutadiene | | | | | 5% | | |
| | Styrene-isoprene-styrene Copolymer M.I. = 13.0 g./10 min. (200° C./5 kg.) 28.5% styrene | | | 10% | | 5% | | |
| | Styrene-butadiene styrene copolymer M.I. = 11.5 g./10 min. (200° C./5 kg.) 44.5% styrene | 10% | | | 15% | | | |
| | Ethylene-vinyl acetate Copolymer M.I. = 6.0 g./10 min. (190° C./2.16 kg.) 28.0% vinyl acetate | | 10% | | | | | |
| LAYER B | Polypropylene homopolymer M.I. 3.0 g./10 min (230° C./2.16 kg.) | 100% | 100% | 100% | 100% | | 100% | 100% |
| | Polypropylene homopolymer M.I. 2.9 g./10 min (230° C./2.16 kg.) | | | | | 100% | | |
| Orientation Conditions | Oriented/stretching at 150° C. machine direction (MD) | 4 X | 4 X | 4 X | 4 X | 4 X | 4 X | 4 X |
| | transverse direction (TD) | 4 X | 4 X | 4 X | 4 X | 4 X | 4 X | 4 X |
| Film Properties | Thickness μm | 22.5 | 22.5 | 25 | 22 | 23.5 | 21 | 21 |
| | Gloss % 60° C. MD (*) | 39(*) | 15(*) | 15 | 18 | 25 | 42(*) | 134(*) |
| | 1% modulus MD Mpa | 1925 | 1910 | 1740 | 2125 | 2122 | 1905 | 1960 |
| | 1% modulus TD Mpa | 2250 | 2145 | 1965 | 1950 | 2160 | 1935 | 2205 |
| | Bond strength on paper (*) N./2.5 cm. | 8.5 | 3.4 | 4.6 | 7.1 | 6.7 | 5.1 | 9.1 |
| | % holes area in A layer(s) | 0.5 | −0.5 | 0.08 | 0.1 | 0.6 | 10.4 | 7.0 |

(*)property measured on the "A" side of this film

As mentioned above, another advantage of the oriented films is that they have a higher modulus (higher rigidity) than non oriented films. This is shown in the comparative Example 6 which describes the properties of a coextruded film of same composition as Examples 1 to 4, but not oriented. The modulus of this film is a less than half of the one of oriented film of Examples 1 to 4. Rigidity (high modulus) is a property required for window envelope film for two reasons: for the envelope converter to allow an optimum window patch unit feeding on the envelope machine, and for the final envelope to minimize wrinkling/buckling of the window panel. Comparative Example 6 would be too floppy for this application.

TABLE 3

| | | Comp. 6 |
|---|---|---|
| | Film structure | A/B/A |
| | Ratio of layers (vol. %) | 15/70/15 |
| LAYER (s) A | GPPS M.I. = 8.5 g/10 min. (200° C./5 kg.) | 70% |
| | HIPS M.I. = 2.3 g/10 min. (200° C./5 kg.) 7.2% polybutadiene | 15% |
| | Styrene-butadiene-styrene copolymer M.I. = 11.5 g/10 min. (200° C./5 kg.) 44.5% styrene | 15% |
| LAYER B | Polypropylene homopolymer M.I. 3.0 g/10 min. (230° C./2.16 kg.) | 100% |
| Orientation conditions | Oriented/stretching at 150° C. | no orientation |
| | - machine direction (MD) | 1 X |
| | - transverse direction (TD) | 1 X |
| Film properties | Thickness m | 29 |
| | Gloss % 60° C. MD | 32 |
| | 1% modulus MD Mpa | 936 |
| | 1% modulus TD Mpa | 755 |
| | Bond strength on paper N./2.5 cm | Not determined |
| | % holes area in A layer(s) | 0 |

What is claimed is:

1. An oriented polymeric film comprising a co-extrudate of A) a first layer baving at least 96 weight percent of a polypropylene and B) an external layer that consists essentially of (by weight):
   a) from 70 to 97% of polystyrene, rubber modified polystyrene or a blend thereof, and
   b) from 3 to 30% of a polypropylene/polystyrene compatibilizer selected from the group consisting of ethylene vinyl acetate copolymers and block or random copolymers of a vinyl aromatic compound with an olefin, wherein the film is oriented after amination in both machine and transverse direction, having a minimum stretch ratio of 3 in the machine direction and 4 in the transverse direction, so as to enhance interlayer adhesion.

2. The polymeric film of claim 1, wherein the stretch ratio in the machine direction is from 4 to 6.

3. The polymeric film of claim 1, wherein the stretch ratio in the transverse direction is from 6 to 10.

4. An oriented polymeric film comprising a co-extrudae of A) a first layer having at least 96 weight percent of a polypropylene and B) an external layer that consists essentially of (by weight):
   a) from 50% to 95% polystyrene
   b) from 0 to 50% rubber modified polystyrene; and
   c) from 3 to 30% of a polypropylene/polystyrenc compatibilizer selected from the group consisting of block or random copolymers of a vinyl aromatic compound and an olefin;
   wherein the sum of romponents b and c is from 5% to 50% of the external layer and wherein the film is oriented after lamination in both machine and tnsverse direction so as to enhance interlayer adhesion.

5. The polymeric film of claim 1 or claim 4, wherein the rubber modified polystyrene contains from four to fifteen percent rubber.

6. The polymeric film of claim 1 or claim 4, wherein the compatibilizer is a vinyl acetate/ethylene copolymer having a vinyl acetate content of from 15% to 30% by weight and a melt index of from 0.5 to 25 g/10 min (190° 2.16kg weight).

7. The polymeric film of claim 1 or claim 4, wherein the compatibilizer is styrene-butadiene-styrene (SBS); styrene-isoprene-styrene (SIS); styrene-isoprene (SI); styrene-butadiene (SB); styrene-ethylene-butylene-styrene (SEBS) or an ethylene-styrene interpolymer (ESI).

8. The polymeric film of claim 1 or claim 4, wherein the external layer of the film has a gloss of not more than 100% according to ASTM D2457.

9. The polymeric film of claim 1 or claim 4, wherein the film has an adhesion to paper of at least 3 N/2.5 cm.

10. The polymeric film of claim 4, which is an oriented film having a stretch ratio in the machine direction of from 3 to 7, a stretch ratio in the transverse direction of from 4 to 12, and wherein the amount of compatibilizer is 15% based on the total weight of the external layer.

11. A window envelope having a transparent panel, which panel is formed from a polymeric film as claimed in claim 1 or claim 4 wherein the film is bondable to paper by using conventional glue for window film applications.

12. The polymeric film of claim 1 or claim 4, wherein the external layer has fewer holes in it than are present in an oriented polymeric film having the same first layer but with an external layer that has no polypropylene/polystyrene compatibilizer.

* * * * *

UNITED STATES PATENT AND TRADEMARK OFFICE
CERTIFICATE OF CORRECTION

PATENT NO. : 6,451,446 B1  
DATED : September 17, 2002  
INVENTOR(S) : Francois J. F. Regnier It is certified that error appears in the above-identified patent and that said Letters Patent is hereby corrected as shown below:

<u>Column 9,</u>  
Line 12, "amination" should read -- lamination --.  
Line 21, "co-extrudae" should read -- co-extrudate --.  
Line 31, "romponents" should read -- components --.  
Line 33, "tnsverse" should read -- transverse --.

Signed and Sealed this

Twenty-fifth Day of February, 2003

JAMES E. ROGAN  
*Director of the United States Patent and Trademark Office*